(12) United States Patent
Blackburn et al.

(10) Patent No.: US 8,281,175 B2
(45) Date of Patent: Oct. 2, 2012

(54) MONITORING A COMPUTER

(75) Inventors: Mark Blackburn, London (GB); Andrew Hawkins, London (GB)

(73) Assignee: 1e Limited, London (GB)

( * ) Notice: Subject to any disclaimer, the term of this patent is extended or adjusted under 35 U.S.C. 154(b) by 323 days.

(21) Appl. No.: 12/609,539

(22) Filed: Oct. 30, 2009

(65) Prior Publication Data

US 2010/0229014 A1 Sep. 9, 2010

(30) Foreign Application Priority Data

Mar. 3, 2009 (GB) .................................. 0903549.4

(51) Int. Cl.
*G06F 1/00* (2006.01)
*G06F 1/26* (2006.01)
*G06F 15/177* (2006.01)
*G06F 15/173* (2006.01)
*G06F 15/00* (2006.01)
*G01R 15/00* (2006.01)

(52) U.S. Cl. .......... 713/323; 713/300; 702/57; 709/220; 709/223; 712/28

(58) Field of Classification Search .................. 713/320, 713/323; 702/57; 709/220, 223; 712/28
See application file for complete search history.

(56) References Cited

U.S. PATENT DOCUMENTS

| 7,143,300 | B2 * | 11/2006 | Potter et al. ................... 713/323 |
| 7,373,399 | B2 * | 5/2008 | Steele et al. .................. 709/223 |
| 7,415,453 | B2 * | 8/2008 | Suzuki et al. ......................... 1/1 |
| 7,984,138 | B2 * | 7/2011 | Bantz et al. .................... 709/224 |
| 2006/0112375 | A1 * | 5/2006 | Schneider ..................... 717/131 |
| 2009/0106571 | A1 * | 4/2009 | Low et al. ..................... 713/310 |

* cited by examiner

*Primary Examiner* — Stefan Stoynov

(74) *Attorney, Agent, or Firm* — Baker & Hostetler LLP

(57) ABSTRACT

A computer implemented method of monitoring the operational state of a computer, comprises running on the monitored computer a monitoring program configured to monitor a set of parameters. The set of monitored parameters comprises for example the name(s) of any process(es) running on the computer, together with i) the values of a plurality of metrics indicating the level of activity of the computer, and/or ii) time. The monitored parameters are provided by the monitoring program to another, monitoring, computer; which runs a comparison program which compares the set of monitored parameters with a predetermined model which determines whether or not the monitored computer is in a predetermined operational state defined by the model, and produces an indication of whether or not the monitored computer complies with the model.

39 Claims, 11 Drawing Sheets

Figure 1

Actual Data
Name of Server
Hardware type
Configuration type
Activity parameters
  Activity metrics
  Processes
  Run time
  Clock time
  Communication Parameters

Models
  Type
  Hardware type
  Configuration type
  Scaling factors

<u>Database</u>

Figure 4

Activity Metrics
    CPU activity
    Disk activity
    Communication with network
    Memory read/write Processes
    Role
    Other Processes Hardware type
Configuration type Run time
Clock time Tolerances on activity metrics Scaling factors <u>Model</u>

Figure 8

| Hardware Type, Configuration Type, Computer Name | | | |
|---|---|---|---|
| TP1 | | | TP.. | TPn |
| Model | Actual | Complies | | |
| Process name 1 | Name 1 | YES/NO | | |
| : | : | . | | |
| Process name n | Name n | . | | |
| CPU activity | Value | . | | |
| Disk activity | Value | . | | |
| Comms metric 1 | Value 1 | . | | |
| : | : | . | | |
| Comms metric m | Value m | . | | |
| Packet source address | Address | . | | |
| Packet destination address | Address | . | | |
| Data type | Type | YES/NO | | |
| Run time | Time | | | |
| Clock time | Time | | | |

Figure 9

MONITORING A COMPUTER

CROSS-REFERENCE TO RELATED APPLICATIONS

This application claims priority under 35 U.S.C. §119(a) to GB Application No. 0903549.4, filed on Mar. 3, 2009, the entire disclosure of which in hereby incorporated by reference.

BACKGROUND OF THE INVENTION

1. Field of the Invention

The present invention relates to a computer implemented method of monitoring a computer, a network of monitored computers and related methods, computers and computer programs.

2. Description of the Related Technology

A computer consumes power whether or not it is fully active. A computer when in a state commonly referred to as idle, as for example when an idle thread is running and no processes are running, may consume around 60% or more of its fully active power consumption. A computer in a network when apparently idle may be at least intermittently carrying out various background tasks such as back-ups, communicating with the network and carrying out other operations such as downloading updates or programs.

In a large server farm, there may be hundreds of servers and in many cases there are more servers than are needed to provide the average level of services required of the farm so as to have spare capacity to cope with peaks in demand. Servers within a farm have different roles. Some may be database servers, others web servers, and yet others e-mail servers amongst other roles. Furthermore it is possible that some servers are continuously idle or only performing background tasks without performing their allocated role. It is desirable for example to identify servers which are serving no useful function and determine whether to at least cause them to adopt a low power state, or switch them off, or even remove them from the farm.

In a farm, physically identical servers may have different roles, and thus be running different software. Servers carrying out the same role may be physically different and/or be running different versions of the same software. A farm may comprise servers which are physically different or are different versions of nominally the same physical design of server. Such differences cause the servers to behave differently both when performing their roles and when not performing their roles.

There is a need to identify servers which are in particular operational states. An example of such a state is a state in which a server is not fulfilling a role deemed useful.

SUMMARY OF CERTAIN INVENTIVE ASPECTS

According to one inventive aspect, there is provided a computer implemented method of monitoring the operational state of a computer, the method comprising: running on the monitored computer a monitoring program configured to sense a set of activity parameters indicative of the activity of the monitored computer, providing the sensed activity parameters to a monitoring system; and, running on the monitoring system a comparison program which i) compares the set of activity parameters provided by the monitored computer with a predetermined model which defines a predetermined operational state of the monitored computer, and ii) produces an indication of whether or not the monitored computer complies with the model.

According to another inventive aspect, there is provided a computer implemented method of monitoring the operational state of a computer, the method comprising: running on the monitored computer a monitoring program configured to sense a set of parameters comprising the names of one or more processes running on the computer, together with i) the values one or more activity metrics indicating the level of activity of the computer, and/or ii) time; providing the sensed parameters to a monitoring system; and, running on the monitoring system a comparison program which compares the set of parameters provided by the monitored computer with a predetermined model by which it can be determined whether or not the monitored computer is in a predetermined operational state defined by the model, and produces an indication of whether or not the monitored computer complies with the model.

Certain embodiments of the invention enable the identification of computers in a network which are not compliant with the model. For example the embodiments allow the identification of computers which are not performing their role and are thus wasting energy.

In one or more embodiments, the predetermined operational state defined by the model is a state in which the monitored computer is not fulfilling its role, for example a state in which it may be regarded as powered up, consuming power, but effectively not in service and thus a candidate for being put into a low power state, switched off, or removed from any network to which it is connected. The predetermined state may be a state in which the computer is idle. The predetermined state may be a state in which the monitored computer is performing no useful function. The predetermined state may be some other state of interest to the controller or administrator of the computer.

The indication of whether or not the monitored computer complies with the model may be a signal which is used to automatically control the power consumption of the monitored computer.

The indication of whether or not the monitored computer complies with the model may be a signal which is sent to an administrator's work station alerting the administrator to analyze the role and function of the monitored computer.

These and other aspects of the invention are set out in the claims to which attention is invited.

BRIEF DESCRIPTION OF THE DRAWINGS

For a better understanding of the disclosure and claims, reference will now be made by way of example to the accompanying drawings in which:

FIG. 4 is a schematic diagram of data stored by a database of FIG. 1;

FIG. 8 is a schematic diagram of data used by a model;

FIG. 9 is a schematic diagram illustrating elements of a display of the comparison of a model with actual activity parameters

DETAILED DESCRIPTION OF CERTAIN INVENTIVE EMBODIMENTS

Figure 1:
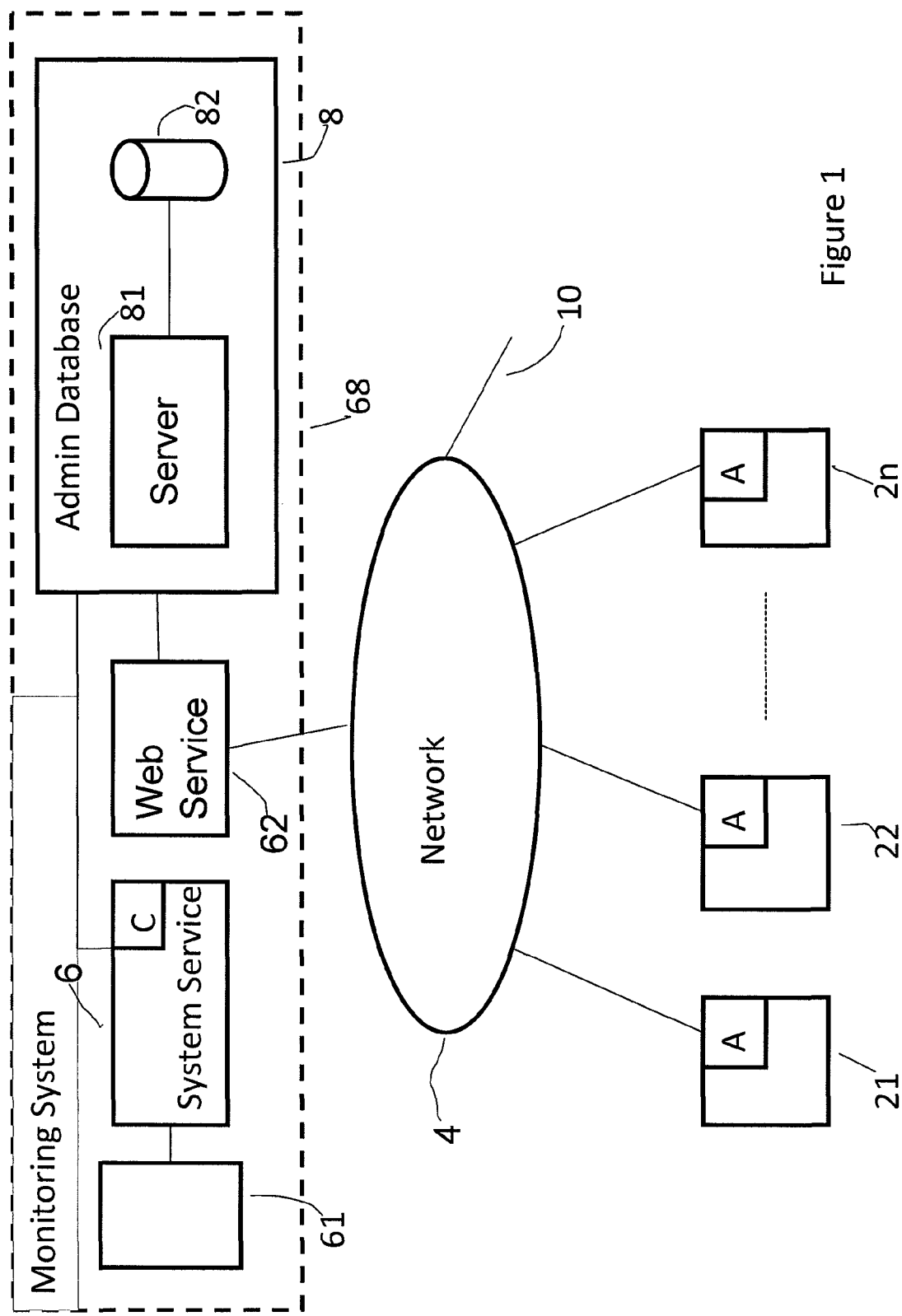
FIG. 1 is a schematic diagram of a network of servers.
Figure 3:
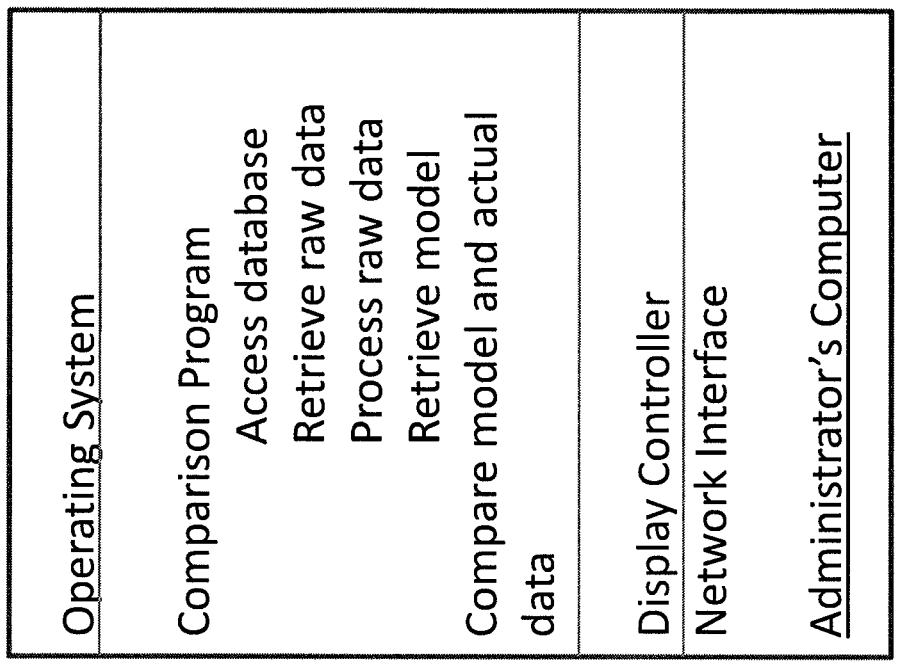
FIG. 3 is a schematic diagram of functions performed by an administrator's computer of FIG. 1.
Figure 2:
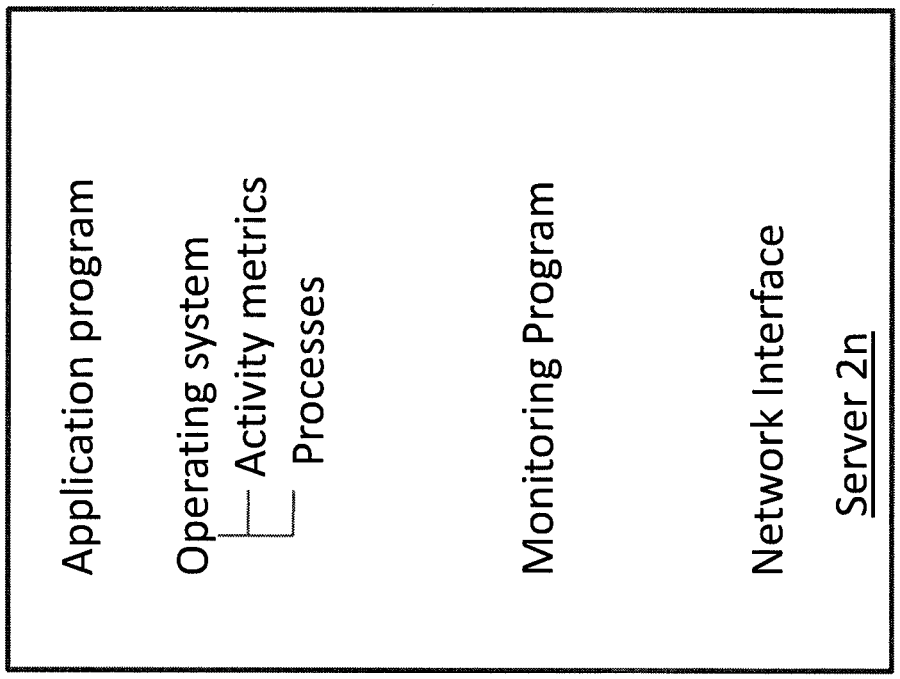
FIG. 2 is a schematic diagram of functions performed by a server of FIG. 1.

Overview of an Example of a System in Accordance with Certain Embodiments Disclosed in FIGS. 1, 2 and 3

Referring to FIG. 1, the system comprises a plurality of servers 21, 22, 2n, an administrator's workstation 6 with a display device 61, a web service 62 running on a computer, and an administrative database 8. The web service 62 is connected by a network 4 to the servers 2n. The administrator's workstation 6 interacts with the database 80. The web service 62 interacts with the database and the servers 2n. The servers 21 to 2n may be servers of a large server farm having a large number of servers, for example hundreds or more servers which may be arranged in subnets as shown in FIG. 1B. The database 8 may itself comprise a server 81 having a data storage device 82. The database 80 and the workstation 60 together form a monitoring system 68.

In this example, as illustrated in FIG. 2, each server has, amongst other programs: an operating system; one or more application programs which define the role of the server; a monitoring program, denoted A in FIG. 1, which monitors activity of the server; and a network interface. The monitoring program interacts with the operating system to obtain the data including information identifying the server and other data, referred to hereinafter as activity parameters, it requires. The activity parameters are described below. The monitoring program sends the raw monitored data to the database 8 via the network interface, the network 4 and the web service 62.

In this example, as indicated in FIG. 3, the administrator's workstation 6 has, amongst other programs, an operating system, an interface with the database, a display controller, a raw data processing program and a comparison program. The raw data processing program retrieves raw data from the database 8 and processes the data. The comparison program compares the processed data with a model and displays the results of the comparison. The model is stored in the database. The comparison program is configured to retrieve the model from the database. The model represents a particular operational state of the server; in this example a server which is not performing its role.

The actual activity parameters produced by the monitoring program are retrieved from the database 8, and processed by the raw data processing program, denoted C in FIG. 1, at the administrator's work station 6. The comparison program compares the processed actual activity parameters with the model to determine when, or if, the monitored server complies with the criteria of the model. In one embodiment, the indication of compliance indicates whether or not the monitored server complies with the model: in other words, the indication indicates those servers complying with the model and those servers not complying with the model. An indication of compliance with the model, in one embodiment, causes the administrator's workstation to automatically send a control signal, via the network 4, to the server causing it to adopt a low power state for example. In another embodiment, the indication of compliance is presented to the administrator with the actual activity parameters and the results of the comparison with the model for the administrator to consider. For a server which does comply with the model, the administrator may decide to force the server into a low power state, or switch the server off, or arrange to have the server removed from the network depending on the administrator's analysis of the monitored data.

In an alternative embodiment, processing of the actual data may take place in the database server 81 by the raw data processing program. Furthermore the comparison of the processed actual data with the model may take place in the server 81 and the result of the comparison sent to the workstation 6 for use by the administrator.

Overview of an Example of a Monitoring and Comparison Process

Figure 5:
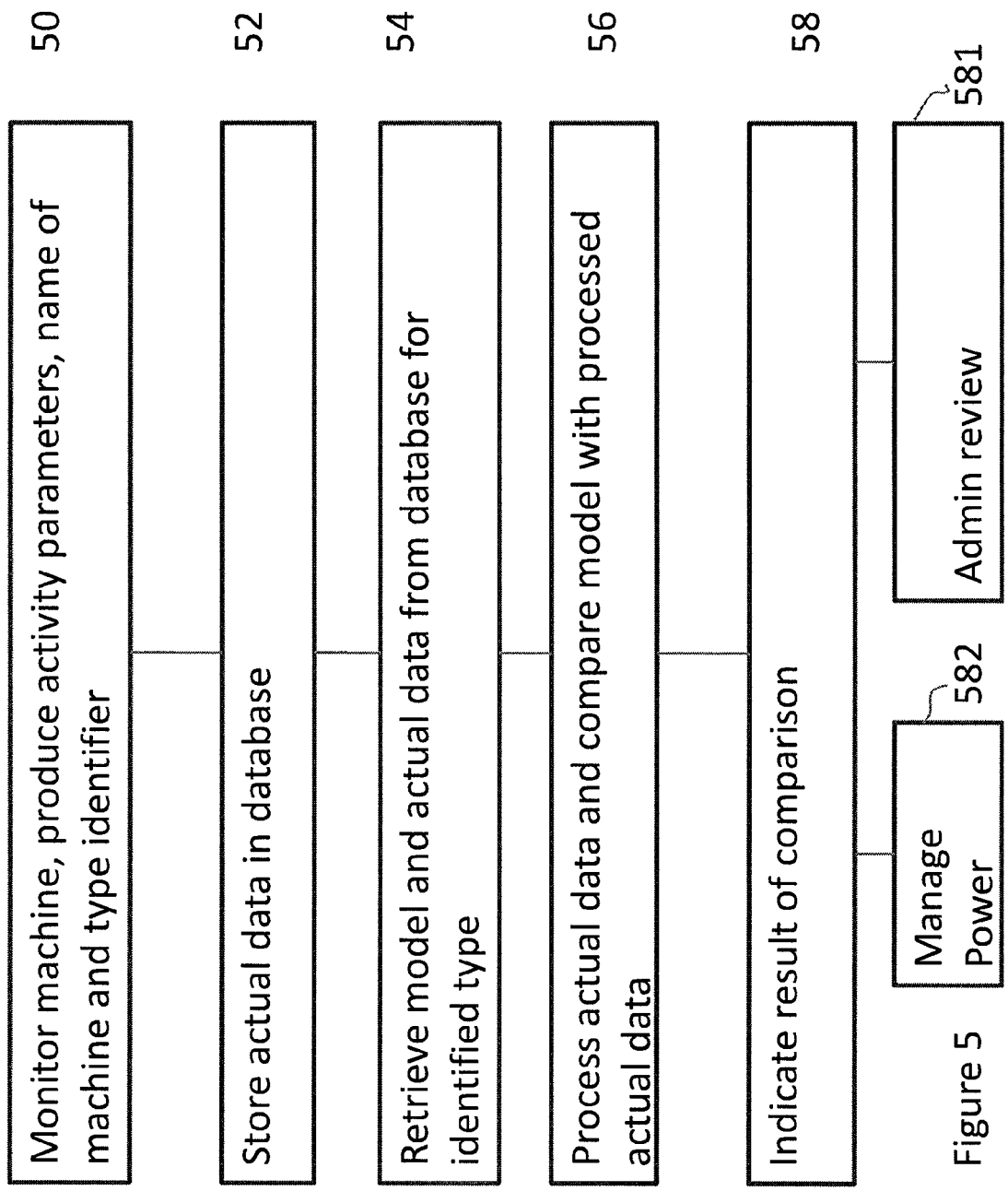
FIG. 5 is a schematic diagram of a method of comparing the model with the activity of a server.

FIGS. 4 and 5 Identifying the Server

In the server farm of FIG. 1 there are many servers. In an ideal network, all the servers are physically identical. However, even then, servers may have different configurations; i.e. they have different roles and so run different software. Furthermore different servers of the same role may run different versions of the software. In practice a network will have a variety of physically different servers of different ages and different software configurations. In this example, servers are identified as types defined by both hardware and software configuration as shown in FIG. 4. They are also identified by the name of the server. The monitoring program on the server requests and obtains the name of the computer and the information about hardware type and software configuration from the Operating System in known manner. The name of the computer and the information about hardware type and software configuration are stored in the database.

As also shown in FIG. 4, the activity parameters in this example include activity metrics, processes running, clock time, run time and communications parameters. Run time is the time since power up of the server.

Comparison of a Model with Actual Activity Parameters: FIG. 5

Referring to FIG. 5, assume the monitoring program is operating on a particular server of a particular hardware type and configuration type as indicated in step 50. The monitoring program produces the actual activity parameters, together with the name of the machine and the type identifier as shown in FIG. 4. In step 52, the actual activity parameters are stored in the database with the name of the server and the type identifier.

The comparison program C in the administrators work station retrieves, in step 54, from the database the actual data and the model appropriate to the type identifier associated with the actual data. The comparison program compares the actual data in step 56 with the model. The actual data may be processed by the raw data processing program before it is compared with the model as will be discussed herein below.

In step 58 the result of the comparison is indicated to the administrator. The administrator may in step 581 consider what action to take depending on the result.

Alternatively, power management may occur automatically in dependence on the result as indicated by step 582. In step 582, a signal is sent to the server and a power management program in the server causes the server to adopt a low power state. The power management program may be part of the operating system of the server.

Monitoring Program

In this example, the monitoring program A interacts with the operating system of the server. Known operating systems produce data relating to the activity parameters of the server and provide data from which processes running on the server and the resources used can be identified. The monitoring program also provides data identifying the type of the server it is monitoring. Identifying the type is described in more detail below. The monitoring program also identifies the run time of the server.

Activity Parameters

The activity parameters include activity metrics of the server, the names of processes running on the server, and the communications parameters.

Activity Metrics

Examples of activity metrics include measures of:
CPU activity;
disk activity;
metrics of communication with the network; and
any other relevant metric.

The communication metrics may include, for example: the number of packets per second exchanged with the network.

Communications Parameters

Communications parameters, associated with network communications, which are monitored, include for example the type of information being sent to, and received from, the network; and/or the addresses from which the information is received and the addresses to which information is sent. These communications parameters are available from metadata sent with the packets.

These metrics and parameters are derived from the operating system in this example embodiment.

Identify Processes Running

The monitoring program A, together with the operating system, identifies the processes running on the computer. In an example, the names of the processes (as contrasted with identifiers) are determined. The resources used by the processes may also be identified.

Monitor Variation of Metrics and Processes with Clock Time and Run Time

The activity metrics, processes and resources used may be monitored with reference to time. Activity is likely to vary with clock time and with run time so monitoring is done on both clock time and on run time. In an example, the variation with time of the metrics, processes and resources used is determined by the comparison program using actual data including run time and clock time information stored in the database. The monitoring program provides the data relating to the metrics, processes and resources, together with data identifying the run time.

An example of an activity, which is based on clock time, is a back-up because a backup is typically run at set clock times.

The activities of different servers are likely to occur at different times for a variety of reasons. Some processes will run at different times on different servers because the servers were powered up at different times. Servers running identical software may have different processors operating at different clock speeds with the result that one server may take longer than another to run a program.

Time Slots

In an embodiment, the activity parameters, including measurements of the metrics, identification of processes, communications parameters and resources used, are allocated to respective time slots so that the activity of the server can be determined for each time slot. The monitoring program obtains the activity parameters from the operating system. The operating system gathers metrics in known manner at regular intervals of the order of milliseconds. The monitoring program obtains the metrics and averages them over the duration of a monitoring time slot. The duration of a monitoring time slot may be any time equal to or longer than the metric gathering interval of the operating system. In examples of the monitoring program the duration of a time slot is in the range 1 to 20 minutes but any other suitable duration may be chosen. The duration of a time slot may be chosen as a compromise between reducing the amount of data to be sent by the monitoring program to the data base and losing resolution in the monitored activity; for example information about a brief spike in activity may be lost. In this embodiment, the activity parameters are sent to the administrator's database once per a reporting period having the duration longer than a time slot in which case the data of many time slots are stored in the monitored server for the duration of a reporting period. Then all the activity parameters from the time slots occurring during the reporting period are sent together at the end of the reporting period.

Installing the Monitoring Program

The monitoring program may be installed on the servers 21 to 2n by sending it to the servers via the network from the monitoring system 68. The program may be an agent.

Producing a Model

In one embodiment, a model is produced by monitoring a server operating under predetermined conditions. For example a server may be configured for operation in the network, powered up and operational at least to the extent it interacts with the network but is otherwise not in service. Such a server is monitored for a period of time, the longer the better, and the raw data is sent to the database for analysis by the administrator. The administrator analyses the data and selects those operating parameters of the server which the administrator considers necessary for use in the model to identify servers according to the administrator's requirements.

Alternatively, a fully operational server which is in service may be monitored over a period of time which is chosen to cover the full range of activity and inactivity of the server. The data produced by the monitoring is sent to the database and analyzed by the administrator who determines from the data what characterizes a particular operational state of the server, which state is of interest to the administrator, and creates the model based on his/her analysis. In this example the state of interest is a state in which the server is powered-up, configured, connected to the network, but performing no useful function.

The analysis by the administrator is aided by software but the creation of the model requires human judgment and input by the administrator.

In one embodiment, a model is provided for each type of server as defined by a combination of hardware and software configuration; i.e. there is a plurality of different models.

In another embodiment, where there are servers of the same software configuration but different hardware, a single model is provided for the servers having the same configuration together with scaling factors for the respective different hardware types. A plurality of models and scaling factors may be produced for respective different configurations.

Producing Scaling Factors.

The scaling factors may be produced empirically by comparing two servers of the same configuration but different hardware to determine the differences of the various criteria of the model.

Example of Producing a Model

Figure 6:
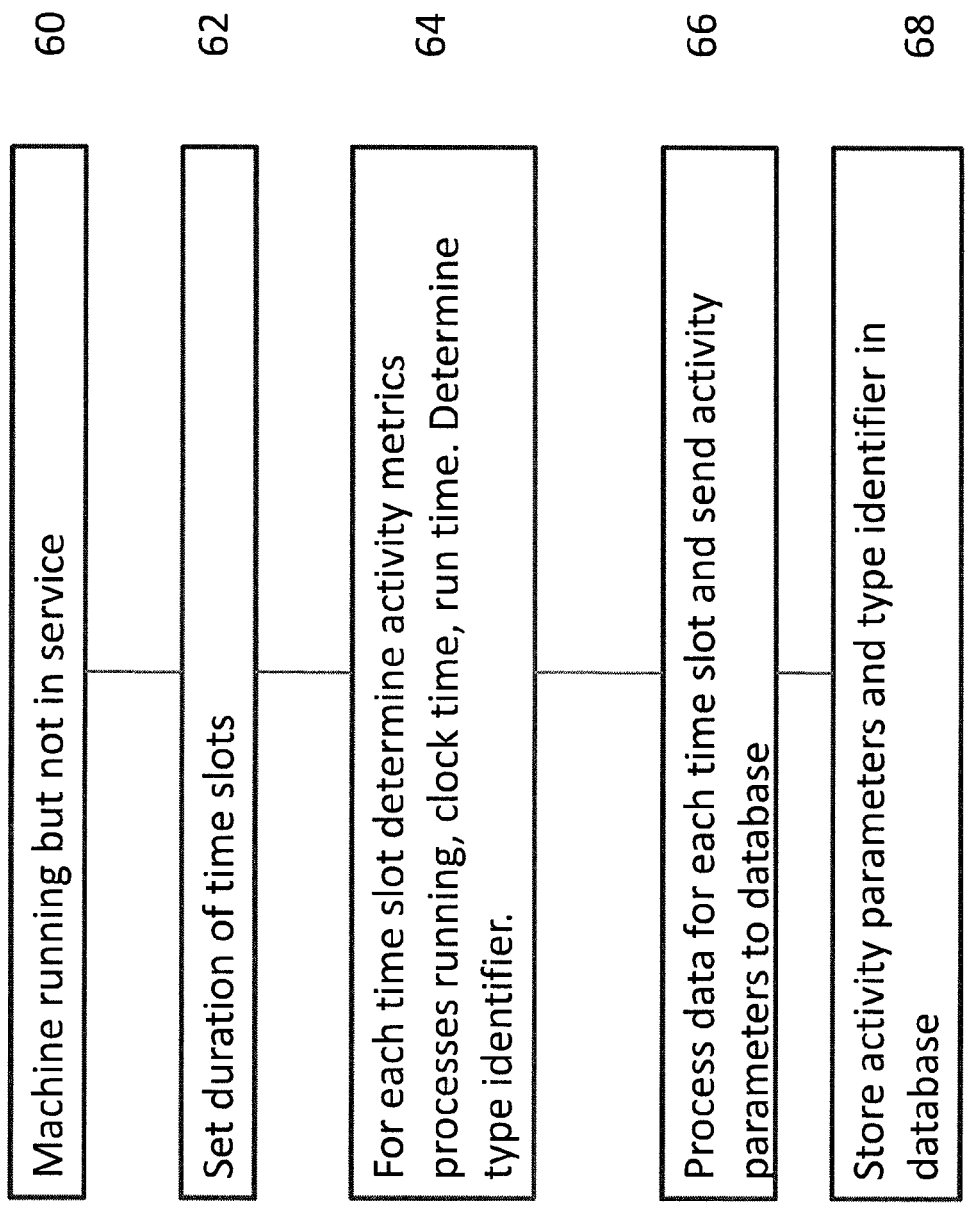
FIG. 6 is a schematic diagram of a method of monitoring a server to produce a model.
Figure 7:
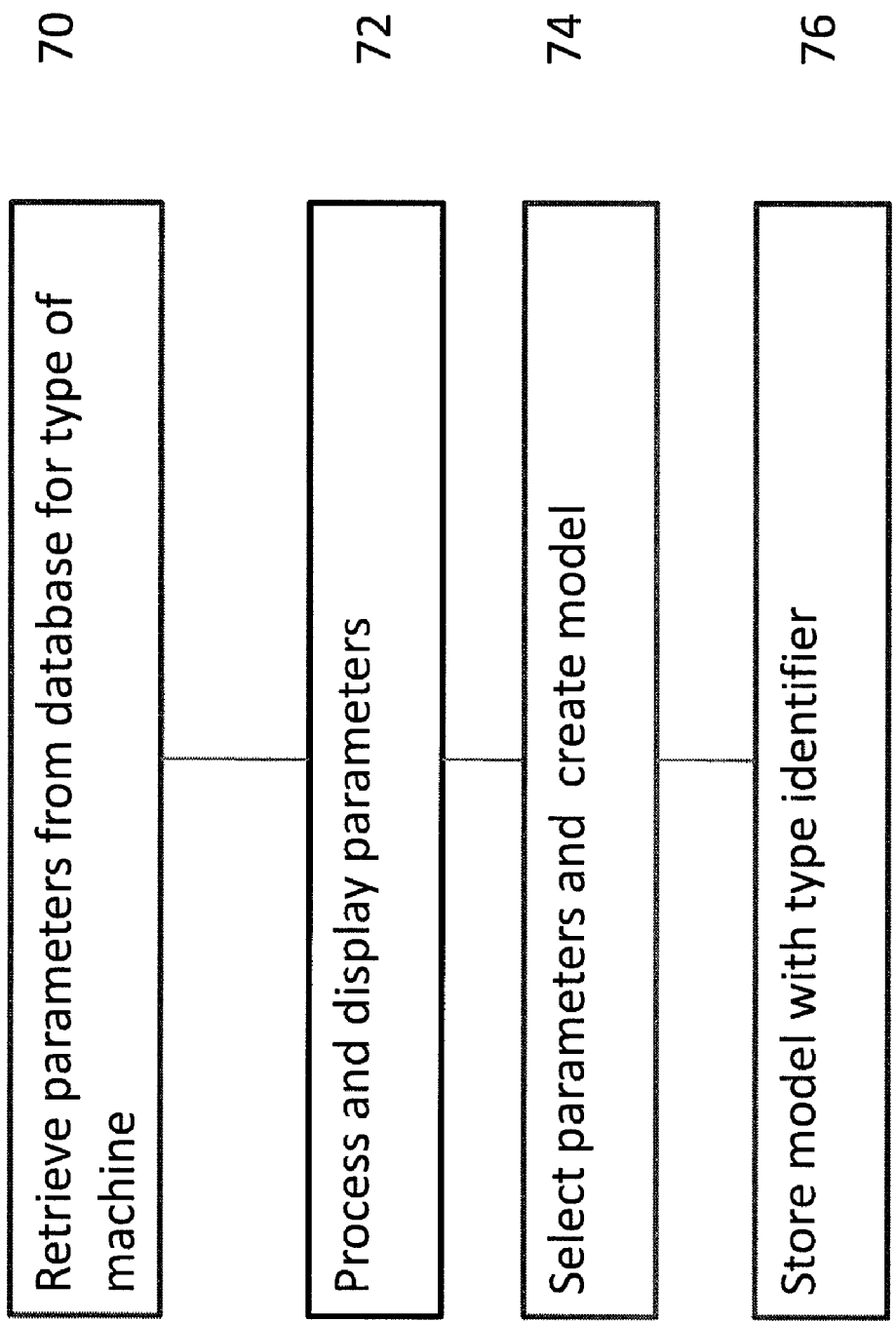
FIG. 7 is a schematic diagram of a method of producing a model.

FIGS. 6 and 7

In the example of FIG. 6, a model is produced by running, in step 60, a server in conditions in which it is active but not in service. For example it is fully configured, connected to a network and powered up. In step 62 the duration of the time slots is selected. In step 64, the monitoring program determines within each time slot the activity metrics, the processes running and other activity parameters, and the run time. The monitoring program processes, in this example averages, the metrics over the duration of each time slot. In step 66, the monitored and processed data may be sent to the administrator's database once per time slot. Alternatively data may be sent in step 66 to the administrator's database once per a reporting period having the duration of a plurality of time slots, e.g. once per minute, in which case the data is stored in the monitored server until it is sent. The data sent to the database includes the hardware type identifier and the configuration type identifier. In step 68, the database stores the data with the type identifiers, run time and clock time.

Referring to FIG. 7, the administrator's database may further process the data sent by the monitoring program. For example the processing done at the database may average the metrics over a selected time period longer than a time slot or reporting period, for example an hour, a day, a week or some other selected time period. The activity parameters, including the processed activity metrics, communications parameters, and the processes running on the monitored server, arranged by time are displayed by the administrator's workstation for the administrator to analyze. The administrator creates the model therefrom by a judicious choice of activity parameters. The arrangement of the data by time allows the administrator to determine when the server is in a particular operational state of interest to the administrator and choose from those times the parameters he or she considers characterize that operational state.

Referring to FIG. 7, in step 70 the activity parameters are retrieved by the administrator's workstation from the database with the type identifier and in step 72 processed for display in a convenient form to be used by a model designer and displayed. In step 74, the model designer selects a set of activity parameters to create a model which in his judgment represents a server in a particular operational state. The model is stored in the database in step 76 with an identifier identifying the type of server to which it applies.

A plurality of different models applicable to different types of server may be stored in the database.

Example of a Model

FIG. 8

An example of a model created by the administrator comprises the identity of the hardware type of server and the configuration type to which the model applies and A) and one or more of elements B), C), D), E) and F) selected from the following list.

A) The names of any processes which are run when the server fulfills its role. This is used to distinguish between times when the server fulfills its role and other times when it is a candidate for complying with the model.

B) The names of any other processes that are deemed of use in the model.

C) Values of the plurality of the metrics CPU activity, disk activity, communication with the network.

D) Communications, for example the type of information being sent to, and/or received from, the network; and/or the addresses from which the information is received; and/or the addresses to which information is sent.

E) The values of any other relevant metric.

F) Time: that is clock time and/or run time

The values of metrics mentioned above as stored in the database as part of the model include a tolerance range.

Examples of Models and Comparisons of Models with Activity Parameters

Consider a server having a defined single role which requires the running of processes X and Y. The server is connected in a network and sends data to and receives data from the network. The hardware type and the configuration type of the server are known. All these examples are based on finding a server which is not performing its role and is therefore a candidate for review by the administrator. A comparison program automatically accesses actual data from the database, processes the actual data, and compares it to a model and provides to the administrator an indication of at least which servers are candidates for review by the administrator. In response to the indication, the Administrator accesses the full comparison results and displays them for analysis. An example of such a full comparison result is shown in FIG. 9 and discussed below.

It will be appreciated that these examples are simplified for clarity of explanation. In practice, a computer fulfilling its role may have many more than two processes associated with its role.

It will also be appreciated that these examples are a few of many possible examples and those skilled in the art can produce many other different models and sets of activity parameters.

Example 1

The model by which the server is judged to be a candidate for action by the administrator for is:

processes X and Y do not run continuously.

The server is monitored by the monitoring program. Activity parameters provided by the monitoring program are compared with the model. Only the processes X and Y and their run times are relevant to the model.

If the comparison shows the server is running processes X and Y continuously it does not qualify as a candidate for action by the administrator.

If it is found that the processes do not run continuously, then the administrator is notified and the administrator analyses the data and determines whether any action is needed.

If for example analysis shows that processes X and Y never run, then the server is a candidate for removal from the network.

Example 2

The model is:

processes X and Y are not running, inclusive-or processes X and Y are running but the communication metric, measuring communication with the network, is below a threshold value.

If the processes X and Y are not running the server is a candidate for review by the administrator.

If the processes X and Y are running but there is, for example very few packets per second as averaged over the selected time period applicable to the model, then the server is a candidate for review by the administrator.

As another example of the application of this model, if the server exchanges packets with the network once per five minutes, and the average rate of packet production and reception is less than the threshold, the server is deemed to be a candidate for review by the administrator.

As another example communications parameters are monitored instead of, or in addition to, the communications metrics. If for example processes X and Y are running and the communications metrics are above the threshold, but the type of information being sent and received via the network is deemed by the model to be unnecessary to the role of the server, then the server is indicated to the administrator as a candidate for review.

Example 3

The model is:
processes X and Y are not running, inclusive-or
processes X and Y are running but the communication metric measuring communication with the network is below a threshold value, inclusive-or
one or more of the other activity metrics is below a threshold value.

If the processes are not running the server is a candidate for review by the administrator.

If the processes are running but there is, for example, very few packets per second as averaged over the selected time period applicable to the model, the server is a candidate for review by the administrator.

If the processes are running and there is a level of communication with the network above the relevant threshold level, but one or more of the other activity metrics is below the relevant threshold level, then the server is a candidate for review by the administrator Example 4

The model is:
inactivity, as defined by one or more of
1) processes X and Y are not running,
2) processes X and Y are running but the communication metric measuring communication with the network is below a threshold value, and
3) one or more of the other activity metrics are below a threshold value,
occurs interleaved with activity (i.e. the absence of 1), 2) and 3)) and the ratio of the time duration of inactivity to the time duration of activity is above a threshold level over a predetermined monitoring interval.

If the duration of activity is for example much less than the duration of inactivity over the predetermined monitoring interval, the server is a candidate for review by the administrator.

Example 5

The model is:
inactivity, as defined by one or more of
1) processes X and Y are not running,
2) processes X and Y are running but the communication metric measuring communication with the network is below a threshold value, and
3) one or more of the other activity metrics are below a threshold value,
occurs for a predetermined continuous length of time even if at another time there is activity.

If that occurs, the server is a candidate for review by the administrator.

Refining the Model

In an embodiment, the actual activity data from the server in service is stored in the database server 8 and is used by the administrator to refine the model.

Display of Comparison Results

FIG. 9

FIG. 9 is a schematic diagram of a display indicating what comparison results may be displayed in a display. The comparison results may be displayed in other ways; the actual manner of displaying the comparison results is a matter of choice by a designer. The display of FIG. 10 has sections of the respective selected time periods, TP1 ... TPn, over which metrics are averaged. In each time period, the activity parameters of the model are displayed with the corresponding respective actual parameters measured or determined by the monitoring program. In this display, for each activity parameter the result of the comparison is shown, and for each activity parameter an indication is shown indicating whether the actual complies with the model.

FIG. 9 shows by way of example, a model having: process names 1 to n; CPU activity and disk activity metrics; communications metrics 1 to m; communications parameters, in this example, packet source and destination addresses and data type; and run and clock time.

The display of FIG. 9 also identifies the hardware type, configuration type and the name of the monitored computer.

Comparison of Actual Data with a Model

FIG. 10A

The actual data from the monitoring processes of the servers as described above are stored in the data base with the identifiers of the servers. In this example the database also stores a plurality of models for different types of server.

When actual data associated with a particular server is to be compared with a model, the server is identified in step S2 from its identifier, e.g. its name and a model appropriate to that server is selected using the identifier in step S4.

The data may be normalized for time and processor speed as in step S8. As discussed above, different servers carrying out the same functions may operate at different speeds and similar events may happen at differing run times on different servers.

Each data item is selected in turn in step S10 and compared with the corresponding data item of the model as indicated by step S12. For data items which do not have variable numerical values, e.g. the name of a process, the comparison is simple matter of establishing whether the actual item is identical to the model item. If the data item has a numerical value which is variable, e.g. CPU activity, the comparison is a matter of establishing whether the value of the actual data is within a range of values set by the model. If the comparison indicates the actual data is similar to the model data then as indicated at S12 a certainty value is increased by a predetermined amount; for example 1, as indicated by step S16, whereas if the actual data is not similar the certainty value is decreased by the predetermined amount, e.g. 1 as indicated by step S18. Once all the data points have been compared an overall certainty value is produced which is the accumulated certainty values produced by steps S16 and S18. The overall certainty value may be an average calculated as the accumulated value divided by the number of data items. The overall certainty value is compared with a threshold value in step S22. If that value equals or exceeds the threshold value then it is determined that the server complies with the model and therefore is not performing its function as shown at S24. Otherwise if the overall certainty value is less than the threshold the server does not comply with the model and is performing its function as shown at S26.

The threshold may be set by the designer of the system or it may be selectable by the administrator at a level which he chooses. If the threshold is based on an average, the threshold is likely to be 50% or greater.

Time Slots

FIG. 10B

Figure 10A:
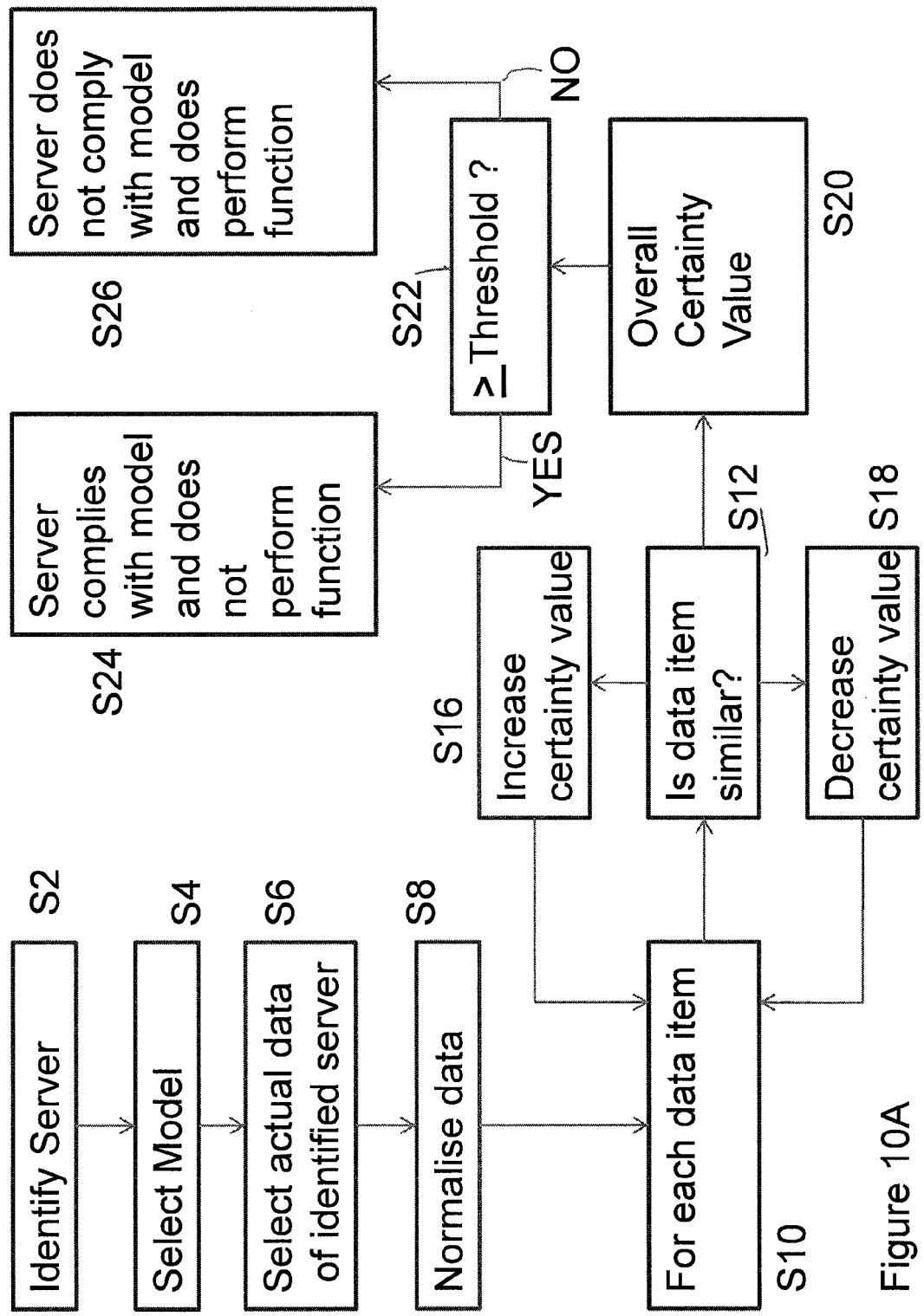
FIG. 10A is a flow chart of a process of comparing a model with actual data.
Figure 10B:
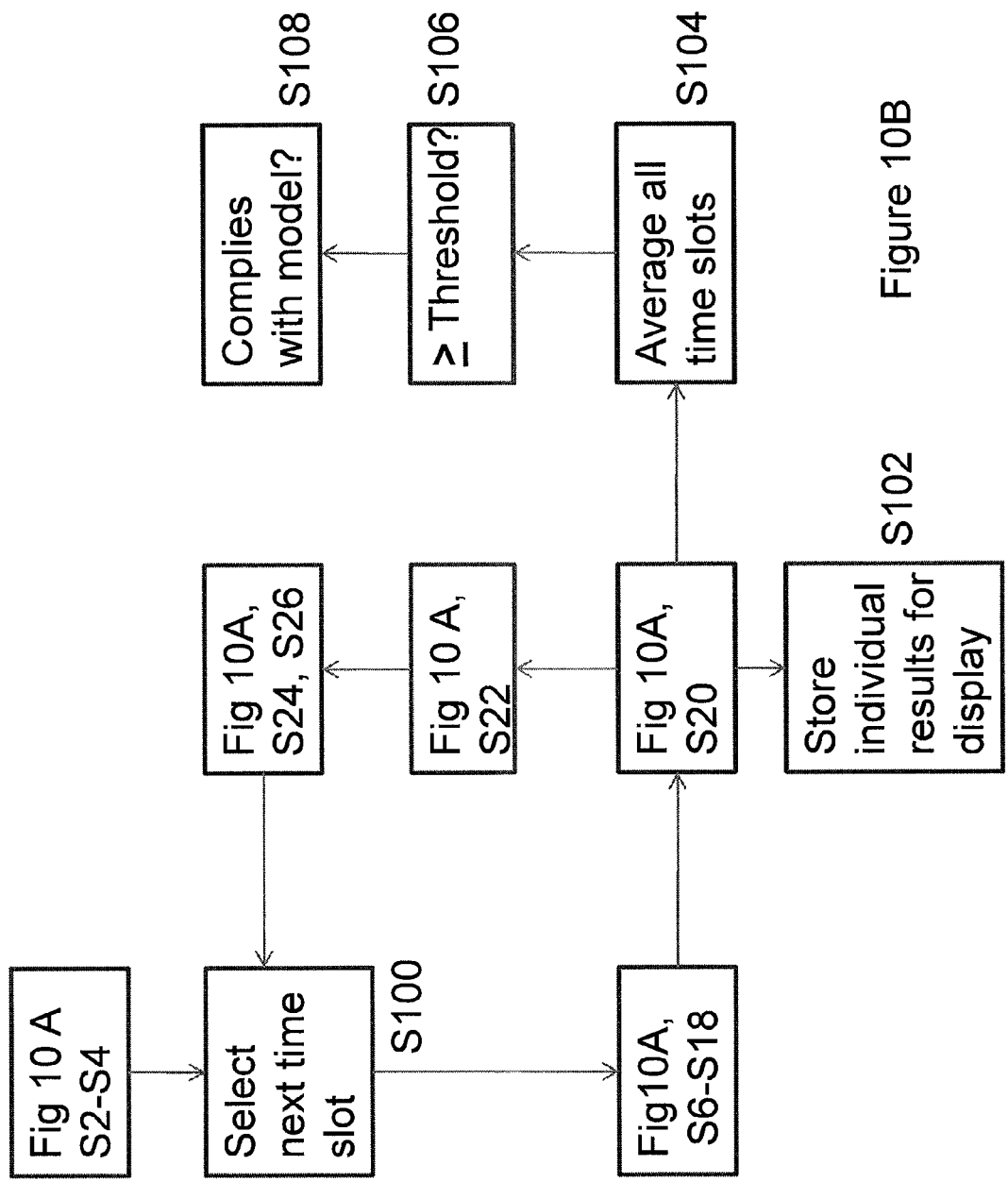
FIG. 10B is a modification of the flow chart of FIG. 10A.

To produce comparison results as shown in FIG. 9, the process of FIG. 10A is modified as shown in FIG. 10B. In FIG. 10B steps identical to those of FIG. 10A are indicated using the same step references as used in FIG. 10A and are not described again here. The comparison is done in each of a series of time slots selected at step S100 and the individual comparison results of each data item are stored in step S102 for display. The overall certainty value calculated at step S20 is the value for the individual time slot. A certainty value for plural time slots may be calculated in step S104 as the sum of the average certainty value of each time slot divided by the number of time slots: that is legitimate provided the number of data items is the same in each time slot and each time slot has the same set of data items. The resulting certainty value is compared in step S106 with a threshold to determine at step S108 whether or not the server complies with the model over the plurality of time slots.

The threshold of step S106 may be fixed or selectable by for example the administrator.

Active Power Management

In one implementation of power management, the model is used to actively manage power usage. Whenever a server is determined to be not performing its allocated role according to the model it is put into a low power state. The administrator or some other controller of the network monitors overall activity level of the server farm and, when he determines more capacity is needed, he reactivates any server from its low power state as needed.

The data used to produce the model indicates the activity parameters of the model arranged by time. A model may be produced which also varies with time. In another implementation of power management, if it is found that a server has a consistent pattern of activity and inactivity with time which can be modeled, the model itself is used to actively manage power. The monitoring program on the server provides feedback to the power manager to confirm the server's activity complies with the model. In this context the power manager controls power by a combination of a power control program operating at the monitoring system 68 communicating with power control agents on the servers:—see also below.

Low Power State

The server may be controlled by an agent on the server to adopt a low power state. The control may be done by a combination of a power control program operating at the monitoring system 68 communicating with power control agents on the servers. Examples of low power states include, amongst others Drowsy:—the server is set to operate in its lowest power state whilst still fully operational. For example the CPU is controlled to operate in its minimum power state with the clock at its lowest frequency setting, and network cards and other cards of the server are set to their lowest power state and lowest frequency of operation;

Sleep/Standby—the processor is powered down but the system state is preserved as the memory subsystem (RAM) which remains powered;

Hibernate—the processor and RAM are powered down and the system state stored in non-volatile memory, e.g. hard disk; and Shut down—the Computer is powered down but power may be applied to certain components such that the server can be triggered to wake-up.

Automatic Power Management

FIG. 11

In this further implementation of power management, a server is monitored as described above and the actual data associated with a predetermined monitoring period of time is analyzed by comparing that data with a model to determine if the server was performing its desired function over that period of time. If during the monitoring period the server is not performing its function it is automatically put in a low power state.

The comparison is done at the monitoring system 68 as described above.

Figure 11:
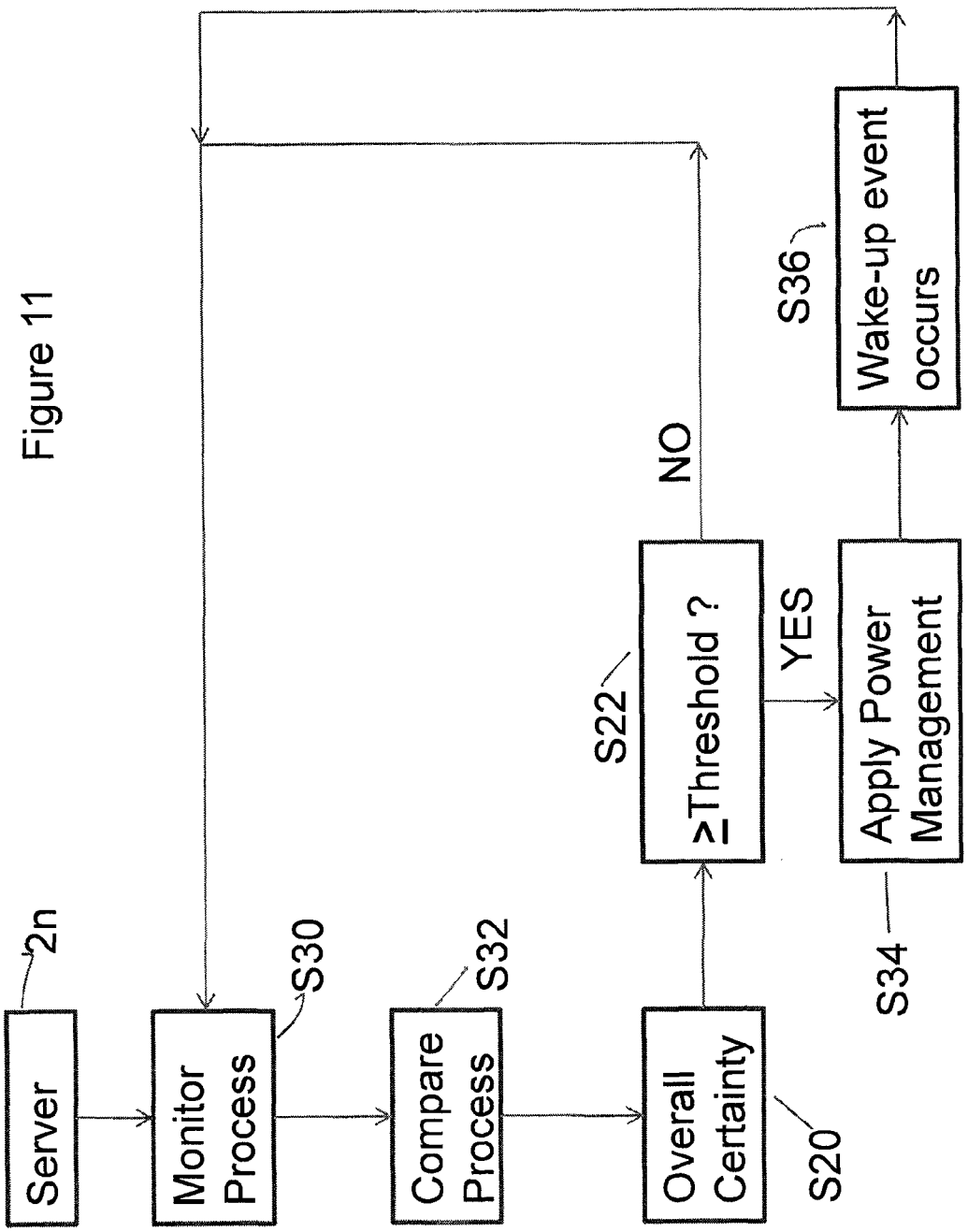
FIG. 11 is a flow chart of a process of managing power consumption of a server.

Referring to FIG. 11, an example of such an automatic power management process is shown.

A server 2n is monitored with a monitoring process S30 as described above. The data produced by the monitoring process over a predetermined of time, referred to hereinafter as the power management window, is compared with a model in step S32, the model and the comparison process being as described hereinbefore in steps S2 to S18 of FIG. 10A. An overall certainty value is produced as described with reference to step S20 of FIG. 10A. The value of the certainty level is compared in a step S22 as described with reference to FIG. 10A with a threshold and if the threshold is exceeded, then power management is applied to the server. If not, the server continues to operate at its current power level. If the server does not comply with the model and thus is deemed to be performing its function, the process is repeated for the next power management window.

In another example of the power management process, the comparison process of FIG. 10B is followed and the average certainty level of all time slots (step S104 of FIG. 10B) is compared with a threshold (step S106 of FIG. 10B) to determine if the server does not comply with the model.

In this example of power management, if the server is deemed to comply with the model and thus be not performing its function, it is placed in the "drowsy state" described above in which the server is set to operate in its lowest power state whilst still fully operational. In the drowsy state the server responds to an event referred to herein as a wake-up event such as reception of data from the network or another input and is arranged to automatically resume higher power operation in response to an event as indicated by step S36 labeled "wake-up event occurs". Once the server has resumed higher power operation, the monitoring process of step S30 resumes.

A wake-up event may be:

1) A scheduled "resume full service" event, for which the system uses a downloaded policy describing start/stop times. At a start time full service is applied. At a stop time the drowsy state is applied.

2) Unexpected peaks in CPU, I/O, or local or remote logon events.

3) A wake-up instruction from the Administrator.

The monitoring system 68 of FIG. 1 carries out the comparison process of step S32 using the monitored parameters provided by the monitoring program on the server 2n, calculates the overall certainty value of step S20 and compares that with the threshold in step S22. The monitoring system 68 sends an instruction to the server via the network 10 to place it in the drowsy state if the result of the comparison requires that. The server has a power management program which responds to the instruction to place the serve in the drowsy state and which responds to a wake up event, independently of the monitoring system 68, to resume higher power operation, that is operation at a power level normal when fulfilling its function.

Computer Programs

Embodiments of the invention may be implemented in one example by a set of programs comprising:

1) a monitoring program to be installed on a server and to provide data to the monitoring system 68;

2) a database program for storing the data from the monitoring programs C of the servers;

3) a program to be run at the monitoring system 68 for presenting the data produced by the monitoring program to the administrator, and for creating the model according to choices made by the administrator; and 4) a program for comparing the model with actual data from the servers provided by the monitoring programs and displaying the results of the comparison.

5) If automatic power management is operational, a program for controlling the servers in dependence on the comparison.

Any of those programs listed in 1) to 5) above may be a set of one or more programs.

A set of models may be stored independently of the programs on for example a server or a carrier for example a storage medium, for distribution independently of the programs.

Carriers

The programs may be carried by one or more carriers. A carrier may be a communications channel, or a computer readable medium. A computer readable medium may be: a tape: a disc for example a CD or DVD: a hard disc: an electronic memory; or any other suitable data storage medium. The electronic memory may be a ROM, a RAM, Flash memory or any other suitable electronic memory device whether volatile or non-volatile. The programs may be stored in a networked server for transfer to computers 2n to be monitored and to a monitoring system 68.

Producing the Model Independently

In the discussion above, the same administrator's workstation 6 is used to both produce the model and to compare the model with monitored servers. However, the model may be produced on a computer different to that used to compare the model with the monitored servers. The model may be produced independently of the network containing the monitored servers and subsequently installed on the monitoring server.

What is claimed is:

1. A computer implemented method of monitoring the operational state of a computer, the method comprising:

running, on the monitored computer, a monitoring program to monitor a set of activity parameters indicative of the activity of the monitored computer;

providing the monitored activity parameters to a monitoring system; and running, on the monitoring system, a comparison program which:

i) compares the set of activity parameters provided by the monitored computer with a model which defines a predetermined operational state of the monitored computer in which the monitored computer is not fulfilling an allocated role, and ii) produces an indication of whether or not the monitored computer complies with the model.

2. The method of claim 1, wherein the set of activity parameters provided to the monitoring system includes the names of one or more processes running on the computer.

3. The method of claim 1, wherein the set of activity parameters provided to the monitoring system includes the value of at least one metric indicating the level of activity of the computer.

4. The method of claim 3, wherein the at least one metric includes one or both of CPU activity and disk activity.

5. The method of claim 1, wherein the set of activity parameters provided to the monitoring system includes one or more of: one or more communications parameters; and run time of the monitored computer and clock time.

6. The method of claim 1, wherein the monitoring program provides, to the monitoring system, type data identifying the type of hardware and type of software configuration of the monitored computer.

7. The method of claim 6, wherein the monitoring system selects, from a plurality of models, a model complying with the type data.

8. The method of claim 7, wherein the plurality of models comprises a normalized model relating to computers of the same software configuration and a set of scaling factors relating the normalized model to different types of computer hardware.

9. The method of claim 1, wherein the model comprises values of a plurality of metrics indicating levels of activity averaged over a predetermined period of time.

10. The method of claim 9, wherein the monitoring program monitors the values of the plurality of metrics indicating the level of activity of the computer for at least the predetermined period of time, and the comparison program compares the provided values averaged over the period of time with the model.

11. The method of claim 1, further comprising using the set of parameters provided by the monitoring program to amend the model.

12. The method of claim 1, wherein the monitored computer is one computer of a plurality of computers in a network, each computer having a copy of the monitoring program, the plurality of computers in the network being linked via the network to the monitoring system.

13. The method of claim 1, wherein the model comprises the name of at least one process, and one or more of: one or more other activity parameters; run time; clock time; and one or more communications parameters.

14. The method of claim 1, further comprising storing the set of parameters provided by the monitoring program.

15. The method of claim 1, further comprising managing the power consumption of the monitored computer in dependence on the comparison.

16. The method of claim 15, wherein if the comparison indicates the computer is not fulfilling the allocated role, the monitored computer is placed in a state in which it is fully operational but operating at a lower power level than the power level used when fulfilling its designated purpose.

17. The method of claim 16, wherein the monitored computer automatically resumes the power level used when fulfilling the allocated role in response to a wake-up event.

18. The method of claim 1, wherein the model is produced by:
monitoring a computer for which the role is to be modeled, for each of a plurality of time slots over a period of time, to produce a set of activity parameters and provide each set of monitored parameters, and the type of hardware and software configuration of the modeled computer, to a model data processing system;
using a processing program, at the model data processing system, to process the sets of parameters and display the processed sets for analysis by an administrator;
creating a model by selecting parameters, the model indicating whether or not the monitored computer is in a predetermined operational state in which the monitored computer is not fulfilling the allocated role; and
storing the model in a computer implemented database with an identifier identifying the type of hardware and software configuration of the first mentioned computer.

19. The method of claim 18, wherein the set of activity parameters provided to the model data processing system includes one or more of: the names of any one or more processes running on the computer to be modeled; the values of at least one metric indicating the level of activity of the computer to be modeled; one or more communications parameters, and one or both of run time of the monitored computer and clock time.

20. The method of claim 19, wherein the at least one metric includes one or both of CPU activity and disk activity.

21. The method of claim 19, wherein the model comprises the name of at least one process, and one or more of: one or more other activity parameters; run time; clock time; and one or more communications parameters.

22. The method of claim 19, wherein the monitored computer is a computer to be modeled in service in a network performing a predetermined role.

23. The method of claim 19, wherein the computer to be modeled is in the predetermined operational state for the purpose of creating the model.

24. A networked computer system, comprising:
a plurality of monitored computers to fulfill predetermined roles; and
a monitoring system,
wherein at least some of the monitored computers have a monitoring program to monitor a set of activity parameters representing the operational state of the computer and provide the monitored parameters to the monitoring system,
wherein the monitoring system has a comparison program to:
i) compare the set of parameters provided by the monitored computer with a model to determine whether or not the monitored computer is in a predetermined operational state, defined by the model, in which the monitored computer is not fulfilling an allocated role, and
ii) produce an indication of whether or not the monitored computer complies with the model.

25. The system of claim 24, wherein the activity parameters provided to the monitoring system include one or more of: the names of one or more processes running on the computer, the values of at least one metric indicating the level of activity of the computer, one or more communications parameters, and one or both of run time of the monitored computer and clock time.

26. The system of claim 25, wherein the at least one metric includes one or both of CPU activity and disk activity.

27. The system of claim 25, wherein the model comprises the name of at least one process, and one or more of: one or more other activity parameters; run time; clock time; and one or more communications parameters.

28. The system of claim 24, wherein each monitored computer comprises a power manager responsive to a power management instruction from the monitoring system for controlling power consumption of the monitored computer, the monitoring system producing the power management instruction in dependence on the comparison.

29. The system of claim 28, wherein the power manager is arranged to place the monitored computer into a state in which the monitored computer is fully operational and operating at a lower power level than the power level used when fulfilling the allocated role in response to the power management instruction from the monitoring system.

30. The system of claim 29, wherein the power manager is arranged to cause the monitored computer to automatically resume the power level used when fulfilling the allocated role in response to a wake-up event.

31. A method of determining if a monitored computer is in a predetermined operational state, comprising:
receiving at a monitoring system, from the monitored computer, a set of activity parameters representing the operational state of the computer,
running on the monitoring system a comparison program which:
i) compares the set of activity parameters provided by the monitored computer with a model by which it can be determined whether or not the monitored computer is in a state, defined by the model, in which the monitored computer is not fulfilling an allocated role, and
ii) producing an indication of whether or not the monitored computer complies with the model.

32. The method of claim 31, wherein the model comprises the name of at least one process, and one or more of: one or more activity parameters; run time; clock time; and one or more communications parameters.

33. The method of claim 31, wherein the set of activity parameters received from the monitored computer includes one or more of: the names of any one or more processes running on the computer; the values of at least one metric indicating the level of activity of the computer; one or more communications parameters; and one or both of run time and clock time.

34. The method of claim 33, wherein the at least one metric includes one or both of CPU activity and disk activity.

35. The method of claim 31, further comprising producing at the monitoring system an instruction for the monitored computer for managing the power consumption of the monitored computer in dependence on the comparison.

36. The method of claim 35, wherein, if the comparison indicates the computer is not fulfilling its allocated purpose, the monitoring system produces a power management instruction to place the monitored computer in a state in which the monitored computer is fully operational but operating at a lower power level than the power level used when fulfilling its designated purpose.

37. A monitoring system for determining if a monitored computer is in a predetermined operational state, the monitoring system comprising a computer to receive, from the monitored computer, a set of activity parameters representing the operational state of the monitored computer, the monitoring system having a comparison program which i) compares the set of activity parameters received from the monitored computer with a model to determine whether or not the monitored computer is in a state, defined by the model, in which the monitored computer is not fulfilling an allocated role, and ii) produces an indication of whether or not the monitored computer complies with the model.

38. A nontransitory computer readable medium storing a comparison program to be run on a monitoring computer system and a monitoring program to be run on a monitored computer, wherein:
   the monitoring program which, when run on the monitored computer, monitors a set of activity parameters indicative of the activity of the monitored computer, and provides the monitored activity parameters to the monitoring system; and
   the comparison program, when run on the monitoring computer, i) compares the set of activity parameters provided by the monitored computer with a model which defines a predetermined operational state of the monitored computer in which the monitored computer is not fulfilling an allocated role, and ii) produces an indication of whether or not the monitored computer complies with the model.

39. The computer readable medium of claim 38, further storing a model processing program for producing the model, comprising:
   a processing program, which, when run on the model processing system, processes the sets of parameters and displays the processed sets for analysis by an administrator who creates the model by selecting parameters, the model indicating whether or not the monitored computer is in a predetermined operational state and enables the model to be stored in a computer implemented database with an identifier identifying the type of hardware and software configuration of the monitored computer to be modeled,
   wherein the monitoring program, when run for a period of time on the monitored computer to be modeled, senses for each of a plurality of time slots over the period, a set of activity parameters, provides each set of sensed parameters to a model processing system and identifies the type of hardware and software configuration of the monitored computer to be modeled.

\* \* \* \* \*